Feb. 10, 1953     M. BRESS     2,627,691
FISHING LINE AND PLUG RETRIEVER
Filed April 4, 1949
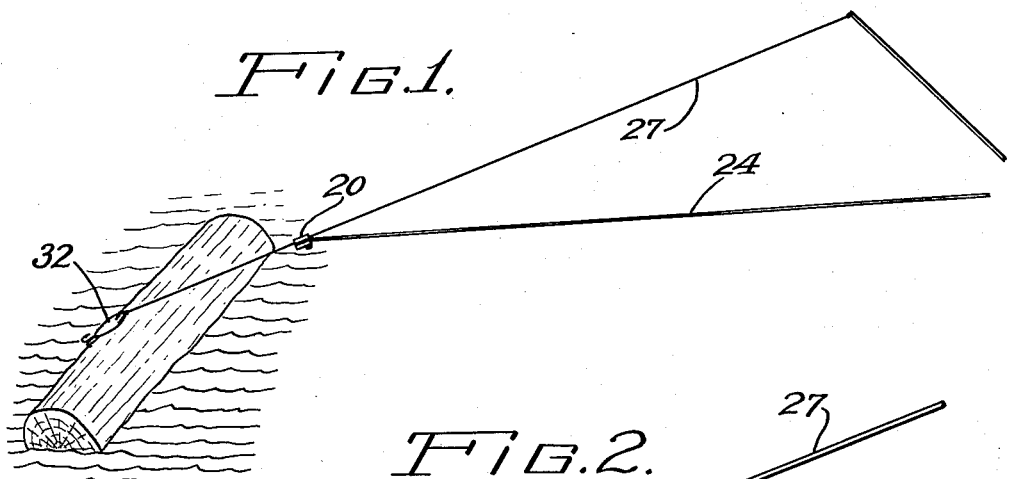
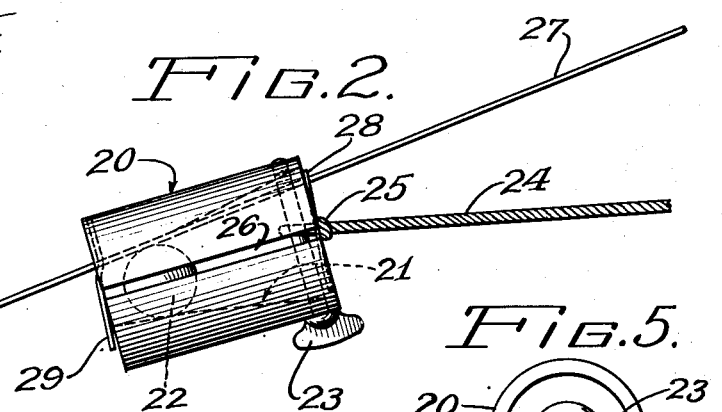
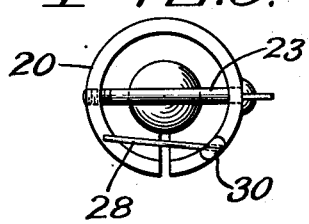
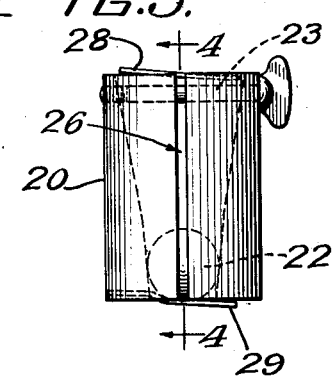
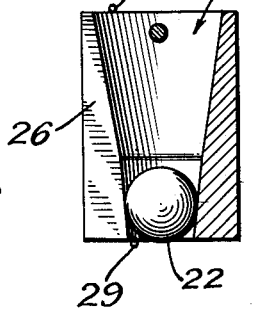
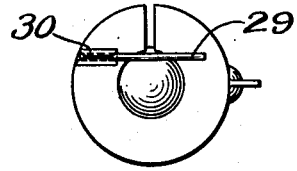
Inventor:
Myer Bress
By (signature)
Attorney Patented Feb. 10, 1953

2,627,691

UNITED STATES PATENT OFFICE 2,627,691

FISHING LINE AND PLUG RETRIEVER

Myer Bress, Chicago, Ill., assignor to Marlin Electric Company, Chicago, Ill., a corporation of Illinois Application April 4, 1949, Serial No. 85,313

2 Claims. (Cl. 43—17.2)

The principal object of this invention is the provision of improvements in fishing line and plug retrievers.

Included among the important purposes and features is the provision in a device of the class described of a weighted tubular member with snatch formations by which it may be threaded onto a fishing line, the hook or lure of which has become snagged, the retriever being attached to a heavy pull-cord and permitted to gravitate as close as possible to the hook or lure, at which time a reverse pull is exerted upon the cord and automatic locking means in the retriever grabs the fishing line for purposes of breaking the latter free from the plug or hook, or of freeing the plug or hook without breaking the line.

Another object is the provision of a retriever of the class described in which the line-grabbing means comprises a weighted member such as a ball rolling in a tapered chamber through which the snagged line is passed, a reverse pull on the retriever locking the weighted member or ball against the line in the narrower parts of the chamber.

Additional objects and aspects of novelty and utility pertain to details of construction and operation of the illustrative improvements described hereinafter in view of the annexed drawings, in which:

Fig. 1 is a sketch illustrating the use of the retriever;

Fig. 2 is a magnified side elevation of the retriever in use as in Fig. 1;

Fig. 3 is a front elevation of the retriever;

Fig. 4 is a vertical section of the same looking in the direction of lines 4—4 of Fig. 3;

Fig. 5 is a top plan view;

Fig. 6 is a bottom plan view.

The form of the retriever shown in Fig. 3 consists essentially of a metal weight 20 having a tapered bore 21, as in Fig. 4, and containing a weighted member or ball 22, which fits snugly into the lower or leading end of the bore, as illustrated in Fig. 4, and quite loosely in the upper or trailing regions of the bore which are the widest.

A wing bolt 23 (Figs. 3 and 5) is threaded transversely across the wider or trailing mouth of the tapered bore and serves to prevent escape of the ball 22 and also as an attaching cleat for the heavier retrieving cord 24, an end of which is passed around the wing bolt and knotted, as at 25 of Fig. 2, when the device is prepared for use.

A longitudinally extensive slit 26 is provided in one side of the weighted tube as an access opening through which the fishing line 27 (Fig. 2) may be passed in applying the retriever to a snagged line, there being provided on the top and bottom faces of the retriever, as in Figs. 5 and 6, laterally projecting retainer pins 28 and 29 blocking the slit at these points, said pins being crimped or swedged into the retriever, as at points 30 in Figs. 5 and 6, and being bent very slightly away from the retriever near their free ends in order that the line may be passed thereunder and threaded through the slot into the bore.

In the use of this embodiment of the retriever, as illustrated in Fig. 1, it may be assumed that the line 27, attached to a lure 32, has become snagged and that the angler has threaded the retriever 20 onto the line, in the manner heretofor described and as illustrated in Fig. 2, after having attached a retriever cord 24, and that the retriever is permitted to gravitate toward the snagged lure by a proper angular positioning of the line 27 and/or manipulation of the pull-cord 24.

When the retriever 20 arrives at the lure the mere impact is often sufficient to free the lure, or repeated movements of the retriever by manipulation of the cord 24 can often accomplish the same thing.

In those instances in which the lure cannot be dislodged by any manipulation of the retriever 20, the latter is permitted to travel as far as possible toward the lure and a retractive pull is applied to the tether or cord 24, which will cause the ball 22 to jam against the line 27 in the narrower leading end of the chamber with the result that the line 27 will be broken away from the lure very close to the latter, thereby having the major part of the line without subjecting the latter to undue stretching or distortion, such lines usually being much more costly than the hook or lure.

I claim:

1. A line and plug retriever comprising a metal cylinder having an axially-extensive through-bore which is tapered from a minimum diameter at one end of the cylinder to a greater maximum diameter, affording a mouth at the opposite end of the cylinder, a jamming ball in said bore and having a diameter greater than said minimum diameter and substantially less than that of said mouth whereby the ball may be introduced at the mouth with considerable spacing between the ball and the sides of the bore at the mouth for a distance approximately two-thirds of the total distance toward the narrow end of the bore, whereby to afford free loose movement of the ball in the upper two-thirds region of the bore so that the cylinder may slide along a snagged line in the bore; a cross-pin threaded into the cylinder crosswise of said mouth to retain the ball and afford to tie-rod for a tether, said cylinder having a longitudinally-extensive slit in the wall thereof leading into the cylinder bore fore admitting a snagged line; and keeper pins guarding entrance to said slit at opposite ends of the cylinder, each said pin having one end swedged into the cylinder and a free end portion projecting crosswise and beyond the margins of the slit to block movement of a line radially out of the slit but permit working the line around said free end into the slit.

2. A line and plug retriever comprising a metal body having a bore extending axially therethrough, said bore being tapered from a least diameter at one end to a greatest diameter or mouth at the opposite end; a ball in said bore and having a diameter greater than that of the least diameter of said base and a substantial amount less than that of the greatest diameter thereof, said taper being shaped to permit substantially free lateral movement of the ball in the upper approximately two-thirds of the bore adjoining said mouth; a tether and ball-retaining pin seated in the body at the mouth crosswise of the latter to hold the ball in the bore; said body having a longitudinally-extensive slit in the side thereof communicating along the length of the slit with the length of the bore; and a laterally-projecting guard pin extending crosswise of said slit at each axial end of the body, each said pin having one end fixed in the body near one side of the body and an opposite free end portion projecting crosswise of the bore and across the adjacent end of the slit to terminate near an opposite side margin of the body so as to block radial movement of a snagged line into and out of the slit, but permit working said line around said free end portion, said ball being adapted to jam a snagged line in the narrower end of the bore.

MYER BRESS.

REFERENCES CITED

The following references are of record in the file of this patent:

UNITED STATES PATENTS

| Number | Name | Date |
| --- | --- | --- |
| 50,896 | Bowden | Nov. 14, 1865 |
| 205,720 | Blossom | July 9, 1878 |
| 327,100 | Palm | Sept. 29, 1885 |
| 621,132 | Phillips | Mar. 14, 1899 |
| 717,237 | Marsters | Dec. 30, 1902 |
| 917,555 | Davin | Apr. 6, 1909 |
| 2,228,244 | Baker | Jan. 14, 1941 |
| 2,385,415 | Jackson | Sept. 25, 1945 |
| 2,514,760 | Manson et al. | July 11, 1950 |